United States Patent
Matsumura et al.

(10) Patent No.: US 11,337,380 B2
(45) Date of Patent: May 24, 2022

(54) PLANT CULTIVATION FACILITY

(71) Applicant: EARTHSIDE CO., LTD., Kyoto (JP)

(72) Inventors: Yasuhiro Matsumura, Kyoto (JP); Yasufumi Daimon, Kyoto (JP)

(73) Assignee: EARTHSIDE CO., LTD., Kyoto (JP)

( * ) Notice: Subject to any disclaimer, the term of this patent is extended or adjusted under 35 U.S.C. 154(b) by 688 days.

(21) Appl. No.: 16/342,958

(22) PCT Filed: Oct. 25, 2017

(86) PCT No.: PCT/JP2017/038548
§ 371 (c)(1),
(2) Date: Apr. 17, 2019

(87) PCT Pub. No.: WO2018/079618
PCT Pub. Date: May 3, 2018

(65) Prior Publication Data
US 2019/0289794 A1    Sep. 26, 2019

(30) Foreign Application Priority Data
Oct. 25, 2016 (JP) .............................. JP2016-208399

(51) Int. Cl.
*A01G 9/24* (2006.01)
*A01G 31/06* (2006.01)
*A01G 9/20* (2006.01)

(52) U.S. Cl.
CPC .............. *A01G 9/246* (2013.01); *A01G 31/06* (2013.01); *A01G 9/20* (2013.01); *Y02A 40/25* (2018.01)

(58) Field of Classification Search
CPC .......... A01G 9/246; A01G 31/06; Y02A 40/25
See application file for complete search history.

(56) References Cited

U.S. PATENT DOCUMENTS

2016/0212954 A1* 7/2016 Argento ................. A01G 31/06
2016/0235018 A1* 8/2016 Motoyama ............. A01G 31/02
(Continued)

FOREIGN PATENT DOCUMENTS

JP    1988126440 A    5/1988
JP    2004016232 A    1/2004
(Continued)

OTHER PUBLICATIONS

International Search Report for corresponding App. No. PCT/JP2017/038548, dated Jan. 30, 2018.

*Primary Examiner* — Monica L Barlow
(74) *Attorney, Agent, or Firm* — Renner, Otto, Boisselle & Sklar, LLP

(57) ABSTRACT

A plant cultivation facility includes multiple cultivation racks, each of the cultivation racks including multiple shelves for cultivating plants and a pair of closed sides extending in a longitudinal direction, the shelves each forming a tube inner space extending in the longitudinal direction. Each shelf includes an air inlet formed as an opening on one end of the tube inner space and an air outlet formed as an opening on the other end. The plant cultivation facility further includes: a cultivation room containing the cultivation racks; an air-conditioning room separated from the cultivation room; an air-conditioning device positioned in the air-conditioning room for sucking air from the cultivation racks through the air outlets into the air-conditioning room; and a discharge pipe positioned in the air-conditioning room, the discharge pipe being connected to the air-conditioning device for forwarding air from the air-conditioning room to be released into the cultivation room.

11 Claims, 8 Drawing Sheets

(56) References Cited

U.S. PATENT DOCUMENTS

| | | | |
|---|---|---|---|
| 2016/0324089 A1 | 11/2016 | Miyabe | |
| 2016/0324090 A1 | 11/2016 | Miyabe | |
| 2017/0127627 A1 | 5/2017 | Miyabe | |
| 2017/0127628 A1 | 5/2017 | Miyabe | |
| 2017/0127629 A1 | 5/2017 | Miyabe | |
| 2018/0132441 A1* | 5/2018 | Harker | A01G 7/045 |

FOREIGN PATENT DOCUMENTS

| | | |
|---|---|---|
| JP | 2009034055 A | 2/2009 |
| JP | 2010088425 A | 4/2010 |
| JP | 2014082995 A | 5/2014 |
| JP | 2015136356 A | 7/2015 |
| JP | 2016140249 A | 8/2016 |

\* cited by examiner

PLANT CULTIVATION FACILITY

TECHNICAL FIELD

The present disclosure relates to a plant cultivation facility, and more particularly to a plant cultivation facility for cultivating plants.

BACKGROUND ART

A variety of facilities for cultivating plants have been devised. For example, JP 2014-82995 A discloses a plant cultivation facility that generates airflow inside the cultivation room. Inside the cultivation room of the plant cultivation facility, cultivation racks are installed that each include multiple shelves. A partition is provided around the cultivation racks to separate the cultivation room into two spaces. That is, the cultivation racks penetrate the partition and stretches from one space to the other in the cultivation room. The partition is provided with a plurality of pressure ventilators. Each pressure ventilator sucks air from one of the spaces in the cultivation room and supplies this air to the other space. This causes a difference in pressure between the two spaces in the cultivation room to cause air to flow through the cultivation racks.

JP 2016-140249 A discloses a plant cultivation facility that creates a cultivation environment that is homogeneous in terms of humidity. This plant cultivation facility includes cultivation racks having multiple shelves, with its sides closed by reflective plates, and an air-conditioning device provided near the cultivation racks. This publication teaches that, within the cultivation racks, sections in a bright period and sections in a dark period coexist to level out the load on the air-conditioning device, stabilizing the rate of dehumidification to level out humidity.

DISCLOSURE OF THE INVENTION

In each of the plant cultivation facilities of these publications, the air-conditioning device is positioned in the cultivation space, in which the cultivation racks are also positioned. As such, when maintenance of the air-conditioning device or other work is to be done, a worker must enter and exit the cultivation space. This may disturb the cultivation environment.

Further, although the plant cultivation facility disclosed by JP 2014-82995 A can create airflow on each shelf of the cultivation racks, not the entire airflow necessarily reaches the rear end of each cultivation rack, that is, some airflow flows out midway through the cultivation rack through its sides. That is, airflow inside the cultivation rack is disturbed, i.e. not regulated. The longer each cultivation rack, the more such disturbance in airflow becomes.

An object of the present disclosure is to provide a plant cultivation facility that enables strict control of the cultivation environment.

A plant cultivation facility according to the present disclosure is a plant cultivation facility for cultivating plants. The plant cultivation facility includes a plurality of cultivation racks, a cultivation room, an air-conditioning room, an air-conditioning device, and a discharge pipe. Each of the cultivation racks includes a plurality of shelves for cultivating plants and a pair of closed sides extending in a longitudinal direction. Each of the shelves includes an air inlet formed as an opening on one end of a tube inner space and an air outlet formed as an opening on the other end of the tube inner space. The cultivation room contains the cultivation racks. The air-conditioning room is separated from the cultivation room. The air-conditioning device is positioned in the air-conditioning room and sucks air from the cultivation racks through the air outlets into the air-conditioning room. The discharge pipe is positioned in the air-conditioning room, and is connected to the air-conditioning device to forward air from the air-conditioning room to be released into the cultivation room.

The plant cultivation facility according to the present disclosure enables strict control of the cultivation environment.

EMBODIMENTS FOR CARRYING OUT THE INVENTION

Figure 1:
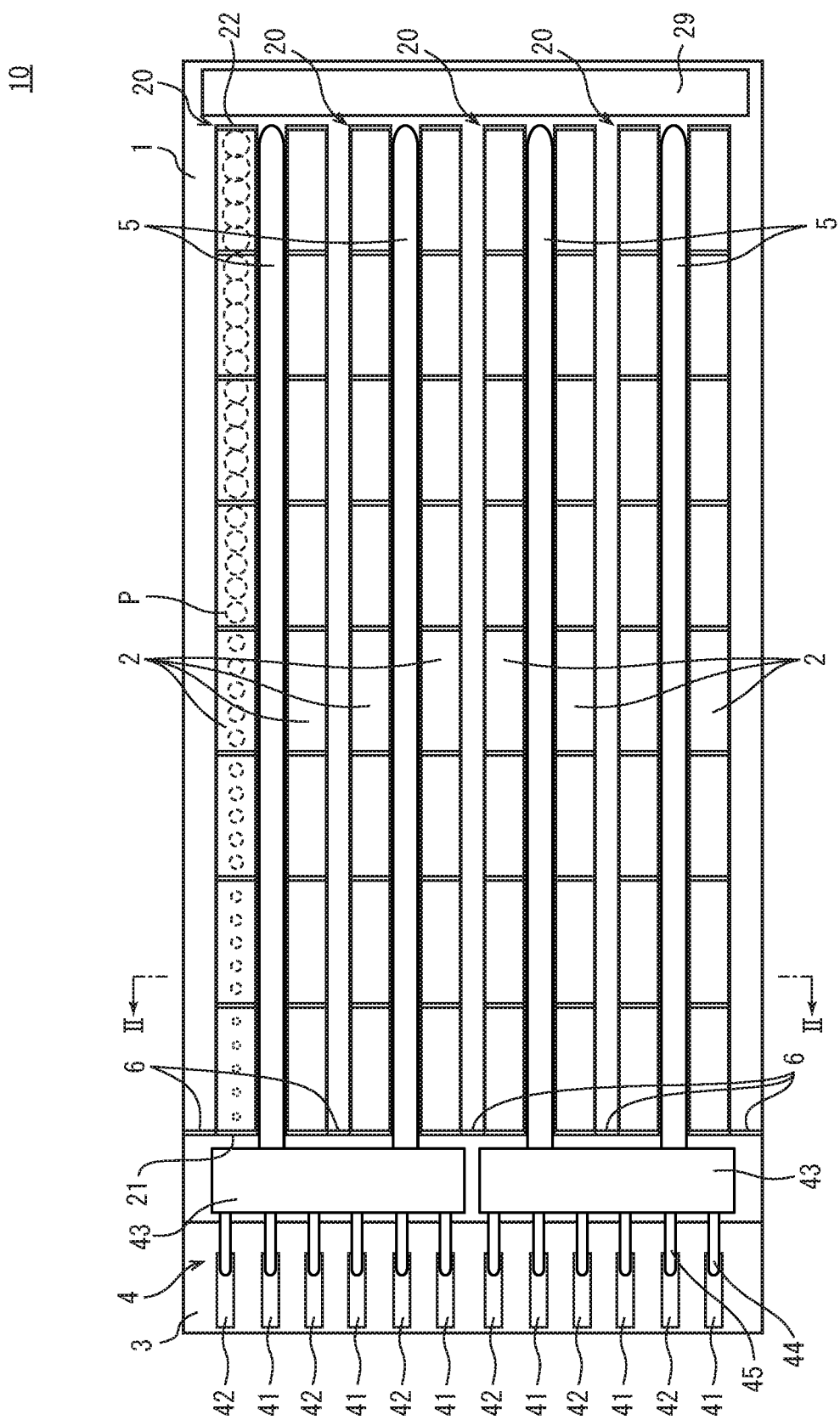
FIG. 1 is a plan view of a plant cultivation facility according to a first embodiment.

The plant cultivation facility according to an embodiments is a plant cultivation facility for cultivating plants. The plant cultivation facility includes a plurality of cultivation racks, a cultivation room, an air-conditioning room, an air-conditioning device, and a discharge pipe. Each of the cultivation racks includes a plurality of shelves for cultivating plants and a pair of closed sides extending in a longitudinal direction. Each of the shelves includes an air inlet formed as an opening on one end of a tube inner space and an air outlet formed as an opening on the other end of the tube inner space. The cultivation room contains the cultivation racks. The air-conditioning room is separated from the cultivation room. The air-conditioning device is positioned in the air-conditioning room and suck air from the cultivation racks through the air outlets into the air-conditioning room. The discharge pipe is positioned in the air-conditioning room, and is connected to the air-conditioning device to forward air from the air-conditioning room to be released into the cultivation room (first arrangement).

In the first arrangement, the air-conditioning room, in which the air-conditioning device is positioned, is separated from the cultivation room. Thus, when maintenance of the air-conditioning device is to be performed, the worker does not need to enter/exit the cultivation room. This will prevent the cultivation environment inside the cultivation room from being disturbed, thereby enabling strict control of the cultivation environment.

Starting from the above-described plant cultivation facility, the air-conditioning device may further include an air filter. In such implementations, the plant cultivation facility further includes an air release means. The air release means is connected to the air-conditioning device. The air release means releases air from the air-conditioning device that has passed through the air filter into the cultivation room (second arrangement).

In the second arrangement, only air that has passed through the air filter of the air-conditioning device and has become rid of contaminants, such as dust, is released into the cultivation room. This will enable yet stricter control of the cultivation environment inside the cultivation room.

Starting from one of the above-described plant cultivation facilities, the air-conditioning device may further include a heating/cooling device, a dehumidifier and a chamber. The chamber is connected to the heating/cooling device and to the dehumidifier. Air from the heating/cooling device and the dehumidifier is introduced into the chamber. The air release means releases air from the chamber into the cultivation room (third arrangement).

In the third arrangement, air that has been subjected to the temperature adjustment by the heating/cooling device and air that has been dehumidified by the dehumidifier are mixed in the chamber, enabling producing good air suitable for plant cultivation. This good air is released by the air release means from the chamber into the cultivation room so as to be supplied to the plants.

Starting from one of the above-described plant cultivation facilities, the plurality of cultivation racks may be positioned in parallel. The plant cultivation facility may further include an air release means. The air release means is connected to the air-conditioning device. The air release means is located higher than the cultivation racks. The air release means releases air from the air-conditioning device into between adjacent cultivation racks (fourth arrangement).

If air were blown down on the top of a cultivation rack, the air would flow along the top of the cultivation rack and, then, separation of airflow occurs at corners of the cultivation rack, making it difficult for the air to enter the uppermost shelf of the cultivation rack. In contrast, in the fourth arrangement, air from the air-conditioning device is not caused to directly hit a cultivation rack, but is released into between adjacent cultivation racks. In such implementations, separation of airflow is unlikely to occur, and it is possible to supply air to the various shelves of the cultivation rack in a uniform manner.

Starting from one of the above-described plant cultivation facilities, the air release means may be a duct extending in the longitudinal direction of the cultivation racks (fifth arrangement).

Starting from one of the above-described plant cultivation facilities, the plant cultivation facility may further include a partition positioned between the cultivation room and the air-conditioning room. The air release means may be a fan provided on the partition (sixth arrangement).

Starting from one of the above-described plant cultivation facilities, two or more cultivation racks may be associated with one air-conditioning device (seventh arrangement).

In the seventh arrangement, two or more cultivation racks are associated with one air-conditioning device, allowing air to be supplied from a common air-conditioning device to the associated cultivation racks. This will allow homogeneous air to be supplied to the various cultivation racks.

A plant cultivation facility according to another embodiment includes a cultivation room, an air-conditioning room, a cultivation rack, and an air-conditioning device. The air-conditioning room is separated from the cultivation room. The cultivation rack is located inside the cultivation room and includes a plurality of shelves. Each shelf of the cultivation rack forms a tube inner space extending in a horizontal direction and includes an air inlet open in the cultivation room and an air outlet connected into the air-conditioning room. The air-conditioning device is positioned inside the air-conditioning room to suck air from the tube inner space into the air-conditioning room through the air outlet and forward the sucked air to the cultivation room (eighth arrangement).

In the eighth arrangement, air flowing out of the air-conditioning room into the cultivation room enters the various shelves of the cultivation rack through their air inlets, and re-enters the air-conditioning room through the associated air outlets. Since each shelf of the cultivation rack forms a tube inner space extending in the horizontal direction, airflow formed on each shelf of the cultivation rack, starting at its air inlet, can reach the associated air outlet. That is, airflow is not disturbed, i.e. is regulated.

Starting from one of the above-described plant cultivation facilities, the plant cultivation facility may further include a discharge pipe. The discharge pipe is connected between a blowout port on the air-conditioning device and the cultivation room to forward air blown out of the air-conditioning device into the cultivation room (ninth arrangement).

In the ninth arrangement, only air blown out of the air-conditioning device is forwarded to the cultivation room, and no air that has just returned to the air-conditioning room is mixed in and forwarded to the cultivation room. That is, all air that is forwarded to the cultivation room has passed through the air-conditioning device, which enables high-precision control of the temperature and humidity of the air while maintaining the cleanliness of the air. Further, even when a worker enters and exits the air-conditioning room to perform maintenance of the air-conditioning device or other work, dust raised in such situations is not forwarded to the cultivation room. This will achieve strict control of the cultivation environment.

Starting from one of the above-described plant cultivation facilities, the air inlet may be a plant exit through which the plants are transportable out of the cultivation rack. The air outlet may be a plant entrance through which the plants are transportable into the cultivation rack (tenth arrangement).

In the tenth arrangement, within the cultivation rack, air flows in the direction opposite to the direction of transportation of the plants, allowing high-humidity, low-temperature air near the plant exit (i.e. air inlet) to be mixed with low-humidity, high-temperature air near the plant entrance (i.e. air outlet), thereby maintaining the temperature and humidity inside the cultivation rack at constant levels.

Starting from one of the above-described plant cultivation facilities, the plant cultivation facility may further include a partition. The partition is positioned between the cultivation room and the air-conditioning room, and is adjacent to the air outlet (eleventh arrangement).

In the eleventh arrangement, the partition is adjacent to the air outlet, which enables designing a compact air-conditioning room.

Embodiments will now be described with reference to the drawings. The same and corresponding components in the drawings are labeled with the same characters, and their description will not be repeated. For ease of explanation, some components in the drawings may be simplified or shown schematically, or some components may be omitted.

First Embodiment

[Construction of Plant Cultivation Facility]
(Overall Construction)
FIG. 1 is a schematic plan view of a plant cultivation facility 10 according to the first embodiment. As shown in FIG. 1, the plant cultivation facility 10 includes a cultivation room 1, a plurality of cultivation racks 2, an air-conditioning room 3, a plurality of air-conditioning devices 4, and a plurality of ducts 5. FIG. 1 does not show a ceiling above the cultivation room 1 and air-conditioning room 3.

(Cultivation Area)

The cultivation room 1 is separated from the air-conditioning room 3 by a partition 6. The cultivation room 1 is a substantially closed space (i.e. closed room). The cultivation room 1 contains the entire cultivation racks 2.

The cultivation racks 2 are positioned parallel to each other in the cultivation room 1. Each of the cultivation racks 2 transports plants P that are being cultivated in a longitudinal direction. More specifically, a plant P is loaded into a cultivation rack 2 through one of its longitudinally determined ends, and then grows while moving in one longitudinal direction through the cultivation rack 2 before being retrieved from the cultivation rack 2 through the other one of the longitudinally determined ends. This longitudinal direction of the cultivation rack 2 will be hereinafter sometimes referred to as direction of transportation. The one of the longitudinally determined ends of the cultivation rack 2 through which the plant P is loaded in will be referred to as upstream end as determined along the direction of transportation, while the end through which the plant P is retrieved will be referred to as downstream end as determined along the direction of transportation.

As will be detailed further below, air flows inside each cultivation rack 2 during cultivation of the plants P. The cultivation rack 2 includes an air outlet 21 and an air inlet 22. The air outlet 21 is located at the upstream end of the cultivation rack 2 as determined along the direction of transportation. The air inlet 22 is located at the downstream end of the cultivation rack 2 as determined along the direction of transportation.

Figure 2:
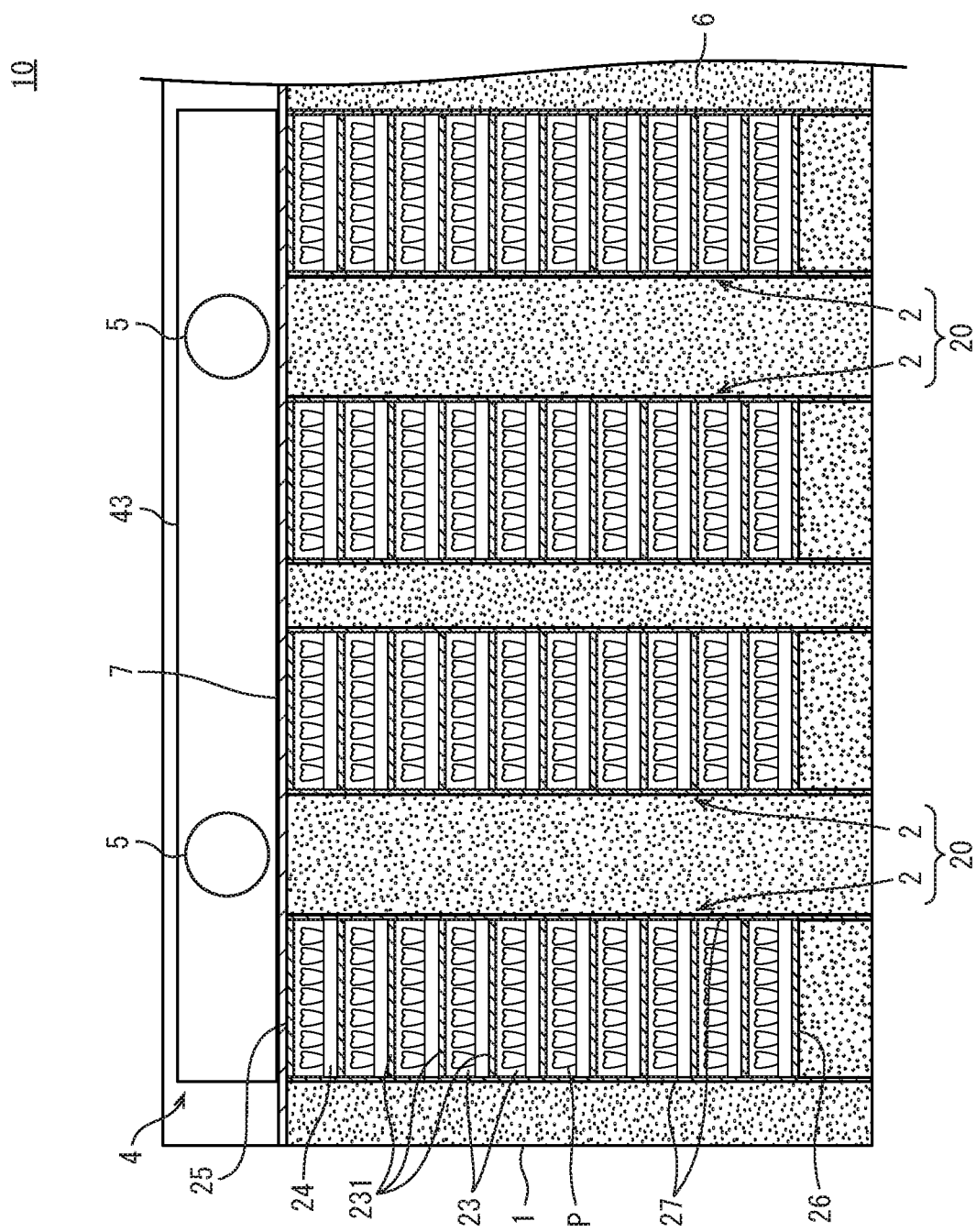
FIG. 2 is a cross-sectional view of the plant cultivation facility of FIG. 1 taken on line II-II.

FIG. 2 is a cross-sectional view of the plant cultivation facility 10 of FIG. 1 taken on line II-II. As shown in FIG. 2, each of the cultivation racks 2 is partitioned by a plurality of shelf boards 231 to provide a plurality of shelves 23. Each shelf 23 has a plurality of plants P placed thereon and is used as a plant cultivation space. Lighting equipment (not shown) is provided above each shelf 23 to illuminate its plants P with light. Although shelf boards 231 are provided in the present implementation, no such boards may be provided. If no shelf boards 231 are provided, nutrient-solution tubs 24, discussed below, may be supported on the frame of the cultivation rack 2, where the nutrient-solution tubs 24 may fulfill the function of shelf boards 231. In short, each shelf 23 is an assembly composed of lighting equipment, a nutrient-solution tub 24 and other components.

Each shelf 23 supports a nutrient-solution tub 24 that contains nutrient solution. A plurality of cultivation panels (not shown) float on the solution in the nutrient-solution tub 24. A plurality of plants P are planted on each cultivation panel. More specifically, each cultivation panel includes a plurality of insertion holes, in each of which a volume of culture media is inserted. A plant P is planted in each volume of culture media. A cultivation panel is loaded into a shelf 23 through its upstream end as determined along the direction of transportation of plants P, and is then transported on the nutrient solution before being retrieved at the downstream end as determined along the direction of transportation.

Each cultivation shelf unit 2 includes a top 25, a bottom 26 and a pair of sides 27. The top 25, bottom 26 and sides 27 extend in the longitudinal direction of the cultivation shelf unit 2. Each of the top 25, bottom 26 and sides 27 is a substantially closed plane. The top 25, bottom 26 and sides 27 form a tube inner space extending in the direction of transportation in the cultivation rack 2. As will be detailed further below, that one of the two openings on the tube inner space which is located upstream along the direction of transportation is the air outlet 21, and the opening located downstream along the direction of transportation is the air inlet 22 (FIG. 1).

Each of the top 25, bottom 26 and sides 27 may be implemented using a plate-shaped member. The plate-shaped member may be, for example, a reflective plate having a reflective surface inside. Each plate-shaped member may be detachable from the cultivation rack 2. In some implementations, the bottom 26 may be closed by the nutrient-solution tub 24 supported on the lowermost shelf of the cultivation rack 2.

Each side 27 may have very small gaps that allow communication between the inside and outside of the cultivation rack 2. The gaps may be gaps created between plate-shaped members if a plurality of plate-shaped members constitute one side 27, for example, or may be one or more through-holes provided in support poles of the cultivation rack 2. In implementations where the sides 27 are constituted by a plurality of plate-shaped members, each plate-shaped member may be fitted between support poles of the cultivation rack 2. The gaps have a size that levels airflow from the air inlet 22 to the air outlet 21 of the tube inner space formed by each shelf 23 and still permits slight inflow of air into the tube inner space from the cultivation room 1. Allowing such slight airflow through the sides 27 to join the main airflow through the tube inner space has the effect of stabilizing the main airflow.

Seen from the downstream end as determined along the direction of transportation, the partition 6 for separating the cultivation room 1 from the air-conditioning room 3 is visible between the adjacent cultivation racks 2, between cultivation racks 2 and the inner wall surfaces of the cultivation room 1, and below the bottoms 26 of the cultivation racks 2. However, the partition 6 is not visible above the tops 25 of the cultivation racks 2. That is, the partition 6 does not entirely surround the cultivation racks 2.

(Air-Conditioning Area)

Returning to FIG. 1, the air-conditioning room 3 is a space separated from the cultivation room 1 by the partition 6. The partition 6 has openings that allow communication from the air outlets 21 of the cultivation racks 2 into the air-conditioning room 3, and is positioned adjacent to the cultivation racks 2 in such a manner that no air flows between the cultivation room 1 and air-conditioning room 3 except through these openings. It should be noted that the cultivation racks 2 in the cultivation room 1 do not protrude into the air-conditioning room 3 through the partition 6. The partition 6 may include a doorway with a physical door.

A plurality of air-conditioning devices 4 are positioned in the air-conditioning room 3. At least portions of the air-conditioning devices 4 are positioned inside the air-conditioning room 3. The air-conditioning devices 4 are contained in a space that includes the air-conditioning room 3 and is separated from the cultivation room 1.

Each of the air-conditioning devices 4 includes a plurality of heating/cooling devices 41, a plurality of dehumidifiers 42, and a single chamber 43. The heating/cooling devices 41 and dehumidifiers 42 are contained in the air-conditioning room 3. The chambers 43 are located above the ceiling portions for the air-conditioning room 3. According to the present embodiment, each air-conditioning device 4 includes a plurality of heating/cooling devices 41 and a plurality of dehumidifiers 42; in some implementations, the number of heating/cooling devices 41 and/or dehumidifiers 42 may be one.

Each of the heating/cooling devices 41 and dehumidifiers 42 includes a fan, for example, for sucking air around them. A heating/cooling device 41 mainly adjusts the temperature of air that it has sucked. A heating/cooling device 41 is generally referred to as air conditioner. A dehumidifier 42 mainly dehumidifies air that it has sucked.

The heating/cooling devices 41 and dehumidifiers 42 are connected to the associated chambers 43. Each heating/cooling device 41 is connected to the associated chamber 43 through a discharge pipe. Each dehumidifier 42 is connected to the associated chamber 43 through a discharge pipe 45. Each chamber 43 receives air from the associated heating/cooling devices 41 and dehumidifiers 42.

A plurality of ducts 5 are connected to each of the air-conditioning devices 4. The ducts 5 are extending in the direction of transportation. The upstream end of each duct 5 as determined along the direction of transportation is connected to the associated chamber 43. Each duct 5 extends from the associated chamber 43 to the proximity of the downstream end of a cultivation rack 2 as determined along the direction of transportation. The downstream end of each duct 5 as determined along the direction of transportation is closed.

The ducts 5 are located directly above the passages formed between the adjacent cultivation racks 2. A duct 5 is provided for a pair 20 of adjacent cultivation racks 2. A plurality of ducts 5 are provided for each air-conditioning device 4. That is, a plurality of cultivation rack pairs 20 are associated with each air-conditioning device 4. In other words, an air-conditioning device 4 is provided for a plurality of cultivation racks 2.

Figure 3:
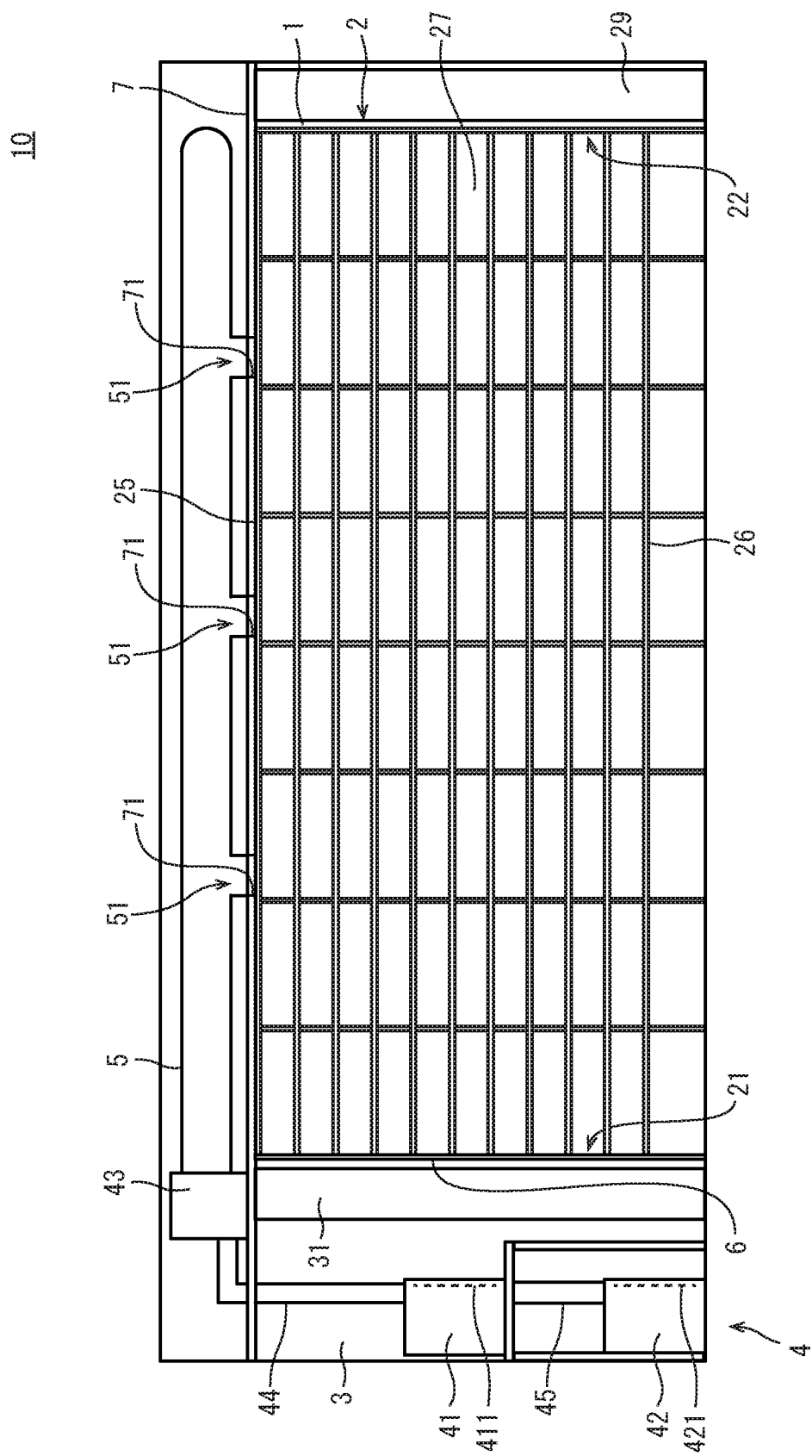
FIG. 3 is a side view of the plant cultivation facility of FIG. 1.

FIG. 3 is a side view of the plant cultivation facility 10. As shown in FIG. 3, the ducts 5 are located above a ceiling 7 above the cultivation room 1 and air-conditioning room 3. The ceiling 7 separates the space in which the ducts 5 are positioned from the cultivation room 1.

The ducts 5 represent an air release means for releasing air from the air-conditioning devices 4 into the cultivation room 1. Each duct 5 has at least one air release portion 51. The air release portions 51 are provided on the lower surface of the duct 5. According to the present embodiment, a plurality of air release portions 51 on the lower surface of each duct 5 are arranged in the direction of transportation. The air release portions 51 may have any construction that allows air to be released from the duct 5. The air release portions 51 may be, for example, holes formed in the duct 5, or may be portions of the duct 5 that have a higher permeability than the other duct portions.

The ceiling 7 has openings 71 at locations corresponding to the air release portions 51 of the ducts 5. According to the present embodiment, each duct 5 has a plurality of air release portions 51, and the ceiling 7 has multiple openings 71. Each of the air release portions 51 of the ducts 5 is connected to the corresponding opening 71 in the ceiling 7.

In the above-discussed plant cultivation facility 10, each shelf 23 of the cultivation racks 2 represents a space that functions as a duct extending in the horizontal direction (or longitudinal direction, or direction of transportation) (this space will be hereinafter sometimes referred to as "duct-function space"). More specifically, each shelf 23 is shaped as a square tube and thus forms a tube inner space (i.e. duct-function space). That is, for each shelf 23, four faces (i.e. top, bottom and sides) are closed and the ends are open to allow airflow to pass therethrough. The duct-function space preferably extends straight, but may be curved midway through it. Each shelf 23 includes an air inlet 22 that is open in the cultivation room 1 and an air outlet 21 connected into the air-conditioning room 3. The heating/cooling devices 41 and dehumidifiers 42 positioned in the air-conditioning room 3 suck air in the duct-function spaces formed by the shelves 23 through the air outlets 21 into the air-conditioning room 3, and forwards the sucked air into the cultivation room 1.

Each discharge pipe 44, on the blowout port of the associated heating/cooling device 41, is connected to the associated chamber 43 for forwarding air blown out of the heating/cooling device 41 to the chamber 43. Although not limiting, in the present implementation, the blowout port of a heating/cooling device 41 is open on the upper surface of the device, while the suction port of a heating/cooling device 41 is open on a side of the device. Each discharge pipe 45, on the blowout port of the associated dehumidifier 42, is connected to the associated chamber 43 for forwarding air blown out of the dehumidifier 42 to the chamber 43. Although not limiting, in the present implementation, the blowout port of a dehumidifier 42 is open on the upper surface of the device, while the suction port of a dehumidifier 42 is open on a side of the device.

Since the air-conditioning room 3 is constructed as described above, it functions not only as an air conditioner, but also as a suction chamber that lowers the air pressure relative to the cultivation room 1. The air-conditioning room 3 uses such negative pressure to powerfully suck air in the duct-function spaces.

An air inlet 22 also serves as a plant exit through which plants P can be transported from the associated cultivation rack 2. An air outlet 21 also serves as a plant entrance through which plants P can be transported into the associated cultivation rack 2.

The plant cultivation facility 10 further includes an entrance device 31 and an exit device 29. The entrance device 31 is positioned within the air-conditioning room 3, adjacent to the air outlets (i.e. plant entrances) 21. The exit device 31 transports plants P, together with cultivation panels or cultivation beds, into the shelves 23 of the cultivation racks 2 through the air outlets (i.e. plant entrances) 21. The exit device 29 is positioned within the cultivation room 1, adjacent to the air inlets (i.e. plant exits) 22. The exit device 29 transports plants P on the shelves 23 of the cultivation racks 2 through the air inlets (i.e. plant exits) 22. The entrance device 31 and exit device 29 may be implemented using stacker cranes, for example.

The partition 6 is positioned between the cultivation room 1 and air-conditioning room 3, adjacent to the air outlets (i.e. plant entrances) 21. More specifically, the partition 6 has openings with substantially the same size as the cultivation racks 2. The air outlets (i.e. plant entrances) 21 of each cultivation rack 2 match the associated opening in the partition 6. With this construction, the cultivation racks 1 do not protrude from the partition 6, enabling designing a compact air-conditioning room 3 while providing a space necessary to accommodate the entrance device 31.

[Operation of Plant Cultivation Facility]

Figure 4:
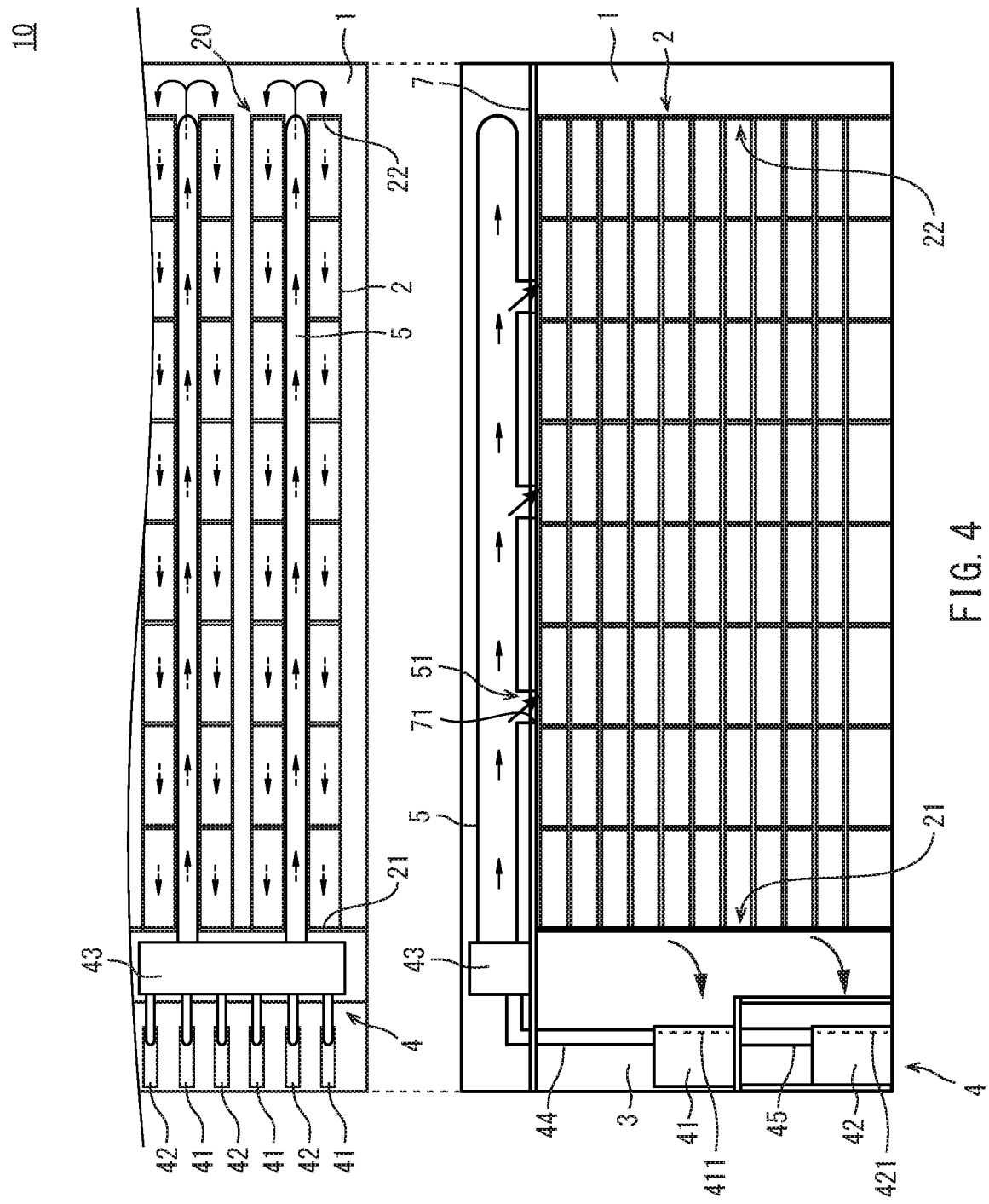
FIG. 4 illustrates how air flows in the plant cultivation facility of FIG. 1.

The operation of the plant cultivation facility 10 will now be described. Particularly, the airflow during the operation of the plant cultivation facility 10 will be described with reference to FIG. 4. In FIG. 4, airflow is indicated by arrows.

The air-conditioning devices 4 operate during cultivation of plants in the cultivation racks in the cultivation room 1. During operation of the air-conditioning device 4, the heating/cooling devices 41 and dehumidifiers 42 suck air from around them. As the heating/cooling devices 41 and dehumidifiers 42 suck air, the air in the air-conditioning room 3 becomes negative relative to the cultivation room 1. Thus, air in the cultivation room 1 moves into the air-conditioning room 3 through the air outlets 21 of the cultivation racks 2.

The heating/cooling devices 41 adjust the temperature of the air that they have sucked, and feed it into the chambers 43 through their discharge pipes. As the heating/cooling devices 41 adjust the temperature, the humidity of the air may change. The dehumidifiers 42 dehumidify the air that they have sucked, and feed it into the chamber 43 through their discharge pipes 45. Each heating/cooling device 41 and each dehumidifier 42 have an air filter 411 and an air filter 421, respectively, each located at the device's side through which air is sucked. The air filters 411 and 421 remove contaminants, such as dust, from the air that the heating/cooling devices 41 and dehumidifiers 42 have sucked.

Inside the chambers 43, air from the heating/cooling devices 41 is mixed with air from the dehumidifiers 42. Air that has been mixed together in the chambers 43 is supplied into the ducts 5. Air flows through the ducts 5 in the direction of transportation. Air flowing through the ducts 5 is released into between the cultivation rack pairs 20 through the air release portions 51 and the openings 71 in the ceiling 7. That is, air from the air-conditioning devices 4 is blown down from the ducts 5 into between the cultivation racks 2.

Air that has been blown down into between the cultivation racks 2 mainly flows through the passages between the cultivation racks 2 toward the air inlets 22, and flows into the cultivation racks 2 through the air inlets 22. As discussed above, the cultivation room 1 has a negative pressure relative to the air-conditioning room 3, which causes air that has entered the cultivation racks 2 to flow toward the air outlets 21. Within a tube inner space (i.e. duct-function space) in a cultivation rack 2, air flows in the direction opposite to the direction of transportation of the plants.

Since a plurality of air release portions 51 are positioned along the longitudinal direction for each cultivation rack 2, the temperature and humidity inside the cultivation room 1 are kept constant, thereby preventing rapid changes caused by differences in temperature between the inside of the cultivation racks 2 and the cultivation room 1.

In implementations where the sides 27 of the cultivation shelf 2 units have gaps, small amounts of air that has blown down from the ducts 5 into between the cultivation racks 2 flow into the cultivation racks 2 through the gaps in the sides 27. This air joins the air flowing inside the cultivation racks 2 toward the air outlets 21, thereby stabilizing airflow inside the cultivation racks 2.

Air flowing inside the cultivation racks 2 flows out of the air outlets 21 into the air-conditioning room 3. The air that has flown out into the air-conditioning room 3 is sucked by the heating/cooling devices 41 and dehumidifiers 42 and passes through the chambers 43 and ducts 5 and is supplied to the cultivation room 1. Thus, air circulates within the plant cultivation facility 10.

Effects of Embodiment

In the plant cultivation facility 10 according to the present embodiment, the air-conditioning room 3, in which the heating/cooling devices 41 and dehumidifiers 42 of the air-conditioning devices 4 are positioned, is separated from the cultivation room 1. Thus, when a worker performs, for example, maintenance of the heating/cooling devices 41 or dehumidifiers 42, the worker does not need to enter and exit the cultivation room 1. This will prevent the cultivation environment in the cultivation room 1 from being disturbed, enabling strict control of the cultivation environment.

For example, if air from the air-conditioning devices 4 were blown down on the tops 25 of the cultivation racks 2, the air would flow along the tops 25 toward the air inlets 22 and, then, separation of airflow occurs at these ends of the cultivation racks 2 which have the air inlets 22. This would make it difficult for air to enter the uppermost shelves of the cultivation racks 2. In contrast, in the plant cultivation facility 10 according to the present embodiment, air from the air-conditioning devices 4 is not caused to directly hit the cultivation racks 2, but is blown down into between the adjacent cultivation racks. Thus, separation of airflow is unlikely to occur, enabling supplying air to the various shelves 23 of the cultivation racks 2 in a uniform manner.

Further, each shelf 23 in the cultivation racks 2 forms a duct-function space extending in the horizontal direction, where sucking constantly occurs at one of its end openings such that airflow formed in each shelf 23 in the cultivation racks 2 is stable all along from the air inlet 22 to the air outlet 21. That is, airflow passing through the cultivation space is regulated.

In the plant cultivation facility 10 according to the present embodiment, one air-conditioning device 4 is associated with a plurality of cultivation racks 2. More specifically, a plurality of ducts 5 are provided for a plurality of cultivation shelf unit pairs 20 and connected to a single air-conditioning device 4. This configuration will allow a single air-conditioning device 4 to supply homogeneous air to a plurality of cultivation racks 2. This will reduce variation in the growth of the plants cultivated in the cultivation racks 2.

As discussed above, in the plant cultivation facility 10 according to the present embodiment, the cultivation racks 2 may have gaps on their sides 27. Air that has been blown down from the ducts 5 into between the cultivation racks 2 mainly flows through the passages between the cultivation racks 2 and flows into the cultivation racks 2 through the air inlets 22. In implementations where gaps are present in the sides 27 of the cultivation racks 2, air flows into the cultivation racks 2 through these gaps, too. Air that has entered the cultivation racks 2 through the gaps in the sides 27 joins the air flowing inside the cultivation racks 2 toward the air outlets 21. This will strengthen the airflow inside the cultivation racks 2 toward the air outlets 21. Further, as air from the air-conditioning devices 4 directly flows into the cultivation racks 2 through the gaps in the sides 27, another effect may be provided, that is, the temperature and humidity of the air in the cultivation racks 2 can be adjusted.

In the plant cultivation facility 10 according to the present embodiment, the air inlet 22 of each cultivation rack 2 is located at its downstream end as determined along the direction of transportation of plants P. That is, for each cultivation rack 2, plants P that have grown to some extent and thus have relatively high transpiration rates are located further toward the air inlet 22. This construction will allow humid air to flow from the air inlet 22 of each cultivation rack 2 toward its air outlet 21, thereby supplying this humid air to relatively small plants P in early stages of cultivation.

Generally, the transpiration rate of a plant P is proportional to the total area of its leaves. As a plant P grows up, its leaves become larger, which increases its transpiration rate to raise humidity but, at the same time, lowers temperature due to its heat of vaporization. On the other hand, a cultivation rack 2 contains lighting equipment, which is a temperature-raising factor. As such, areas near the air inlets (i.e. plant exits) 22, in which plants P that have grown up are located, tend to have high humidity and low temperature, while areas near the air outlets (i.e. plant entrances) 21, in which plants P that have not yet grown up are located, tend to have low humidity and high temperature.

Thus, air flows in the direction opposite to the direction of transportation of the plants P, allowing high-humidity, high temperature air near the air inlets (i.e. plant exits) 22 to mix together with low-humidity, high temperature air near the air outlets (i.e. plant exits) 21, thereby keeping the temperature and humidity in the cultivation racks constant. Further, since air that has been dehumidified by the dehumidifiers 42 flows into the cultivation racks 2 through the air inlets (i.e. plant exits) 22, dry air can be supplied to plants P that have already grown up.

In the plant cultivation facility 10 according to the present embodiment, the air-conditioning devices 4 include air filters 411 and 421. More specifically, each of the heating/cooling devices 41 and each of the dehumidifiers 42 include an air filter 411 and an air filter 421, respectively. In this construction, contaminants such as dust in air that is being sucked by the heating/cooling devices 41 and dehumidifiers 42 can be removed by the air filters 411 and 412. Thus, even when a worker enters/exits the air-conditioning room 3 in order to perform maintenance, for example, the cultivation room 1 can be supplied with clean air only.

Further, the discharge pipes 44 and 45, on the blowout ports of the heating/cooling devices 41 and dehumidifiers 42, are connected to the chambers 43, such that only air blown out of the heating/cooling devices 41 and dehumidifiers 42 is forwarded to the cultivation room 1 and no air that has just returned to the air-conditioning room 3 is mixed in to be forwarded into the cultivation room 1.

In the plant cultivation facility 10 according to the present embodiment, air whose temperature has been adjusted by the heating/cooling devices 41 and air that has been dehumidified by the dehumidifiers 42 are mixed together within the chambers 43. Thus, good air suitable for plant cultivation is produced in the chambers 43. This good air passes through the ducts 5 and is released into the cultivation room 1, and is supplied to the plants P in the cultivation racks 2.

Second Embodiment

Figure 5:
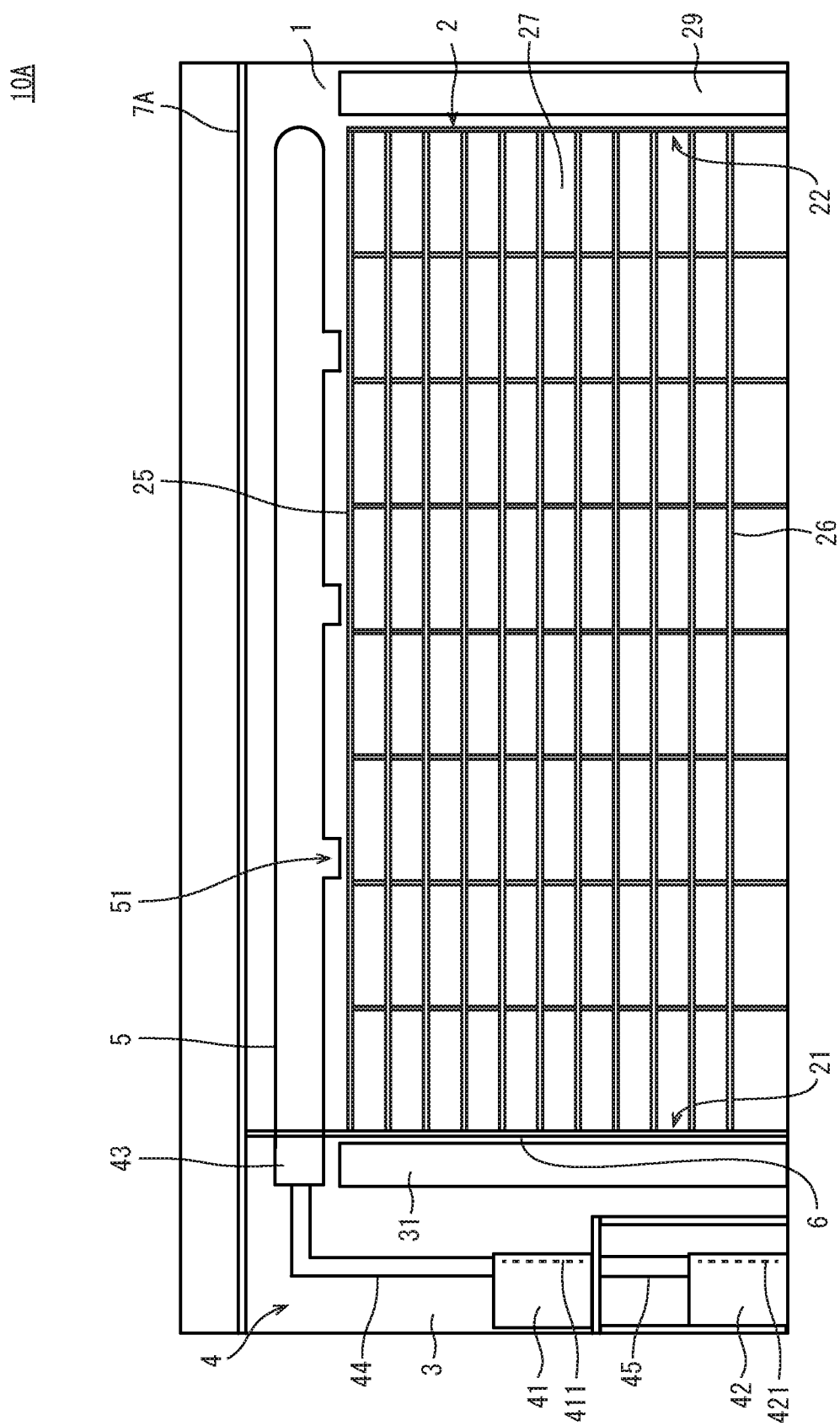
FIG. 5 is a side view of a plant cultivation facility according to a second embodiment.

FIG. 5 is a schematic side view of a plant cultivation facility 10A according to the second embodiment.

As shown in FIG. 5, in the plant cultivation facility 10A, the ducts 5, similar to those of the first embodiment, are each positioned directly above the passage formed between adjacent cultivation racks 2. However, the ducts 5 are located lower than the ceiling 7A for the cultivation room 1 and air-conditioning room 3. That is, the ducts 5 are located in the same space as the cultivation racks 2. The ceiling 7A has no openings corresponding to the air release portions 51. As the ducts 5 are located lower than the ceiling 7A, they are not affected by the temperature under the roof, which is exposed to the open air. This will enable yet stricter temperature control.

Thus, the plant cultivation facility 10A is different from the plant cultivation facility 10 according to the first embodiment in that the ceiling 7A is located higher than the ducts 5. Otherwise, the plant cultivation facility 10A has the same construction as the plant cultivation facility 10 according to the first embodiment.

Third Embodiment

Figure 6:
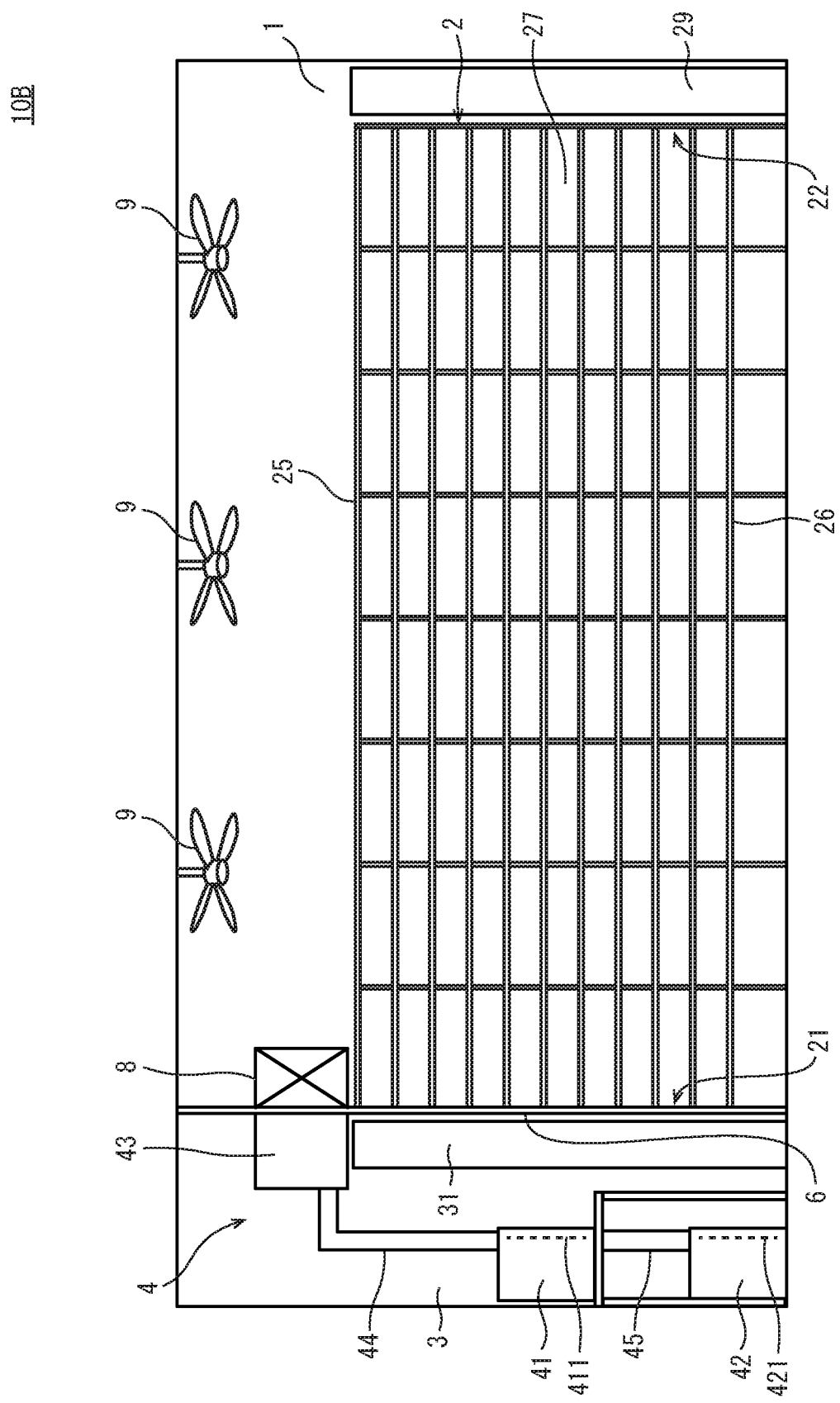
FIG. 6 is a side view of a plant cultivation facility according to a third embodiment.

FIG. 6 is a schematic side view of a plant cultivation facility 10B according to the third embodiment.

As shown in FIG. 6, the plant cultivation facility 10B includes fans 8 that serve as the air release means. The fans 8 are mounted on the partition 6. The fans 8 suck air in the chambers 43 of the air-conditioning devices 4 and releases it into the cultivation room 1.

The fans 8 are positioned to correspond to the passages formed between the adjacent cultivation racks 2. The fans 8 release air from the chambers 43 into between the adjacent cultivation racks 2. The fans 8 are located higher than the tops 25 of the cultivation racks 2.

In the cultivation room 1, ceiling fans 9 are provided directly above the passages formed between the adjacent cultivation racks 2. According to the present embodiment, a plurality of ceiling fans 9 are provided for each passage between cultivation racks 2. The ceiling fans 9 for each passage are arranged in the longitudinal direction of the cultivation racks 2. Air released by the fans 8 into the cultivation room 1 is blown down by the ceiling fans 9 into between the cultivation racks 2.

Thus, the plant cultivation facility 10B is different from the plant cultivation facility 10 according to the first embodiment in the fans 8 replacing the ducts 5. The fans 8 and ceiling fans 9 are located within the same space in which the cultivation racks 2 are located. Otherwise, the plant cultivation facility 10B has the same construction as the plant cultivation facility 10 according to the present embodiment.

Fourth Embodiment

Figure 7:
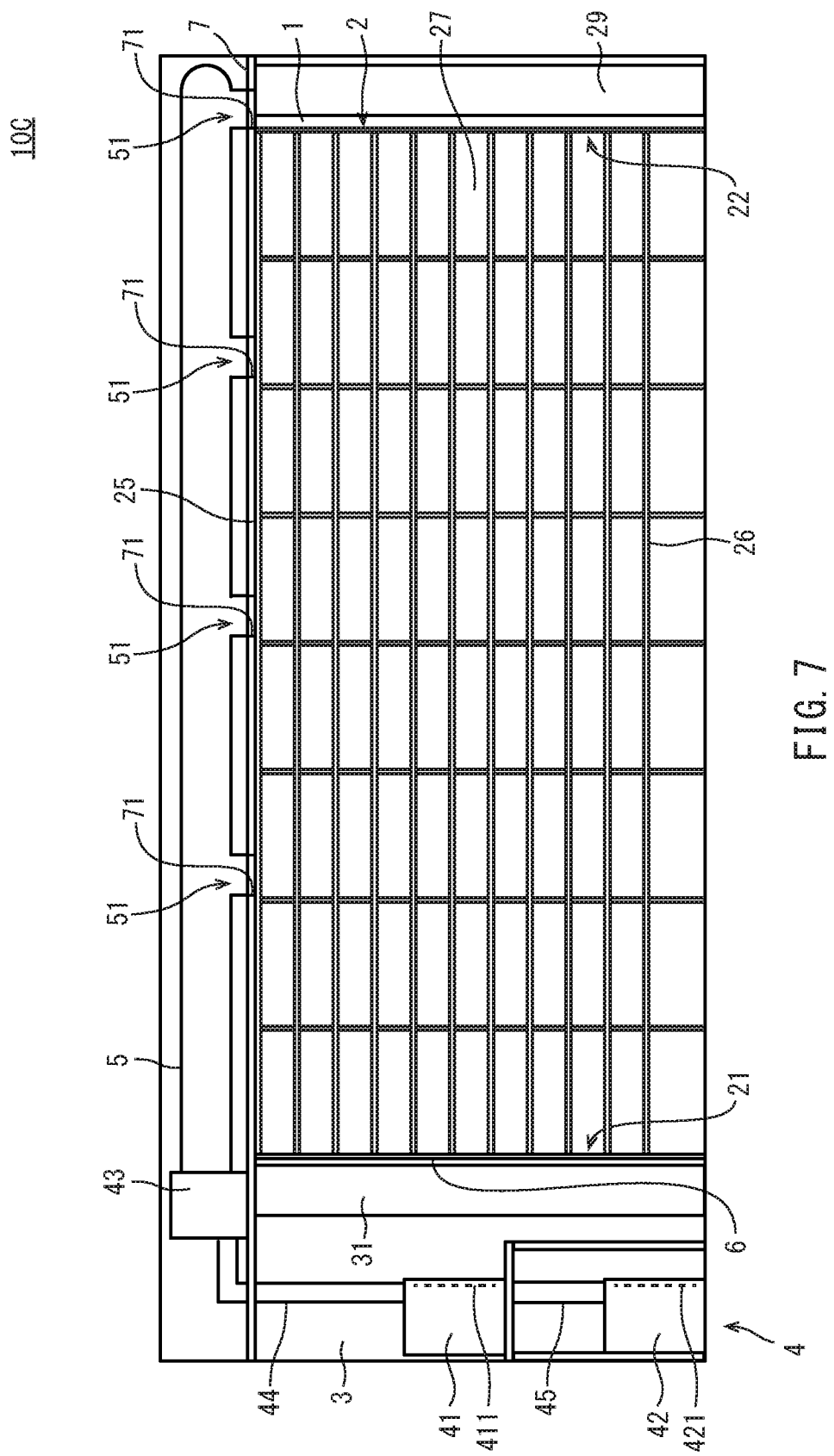
FIG. 7 is a side view of a plant cultivation facility according to a fourth embodiment.

FIG. 7 is a schematic side view of a plant cultivation facility 10C according to the fourth embodiment.

The plant cultivation facility 10C according to the fourth embodiment shown in FIG. 7 is different from the plant cultivation facility 10 according to the first embodiment shown in FIG. 3 in that the ducts 5 extend to above a plant entrance space, which is located adjacent to the air inlets 22 of the cultivation racks 2. Air release portions 51 of the ducts 5 and openings 71 in the ceiling 7 are positioned above the plant entrance space. Otherwise, the plant cultivation facility 10C has the same construction as the plant cultivation facility 10 according to the first embodiment.

Since the ducts 5 extend to above the plant entrance space and air release portions 51 and openings 71 are positioned above the plant entrance space, air can easily reach the air inlets 22 and can easily reach the lowermost shelves of the cultivation racks 2.

Fifth Embodiment

Figure 8:
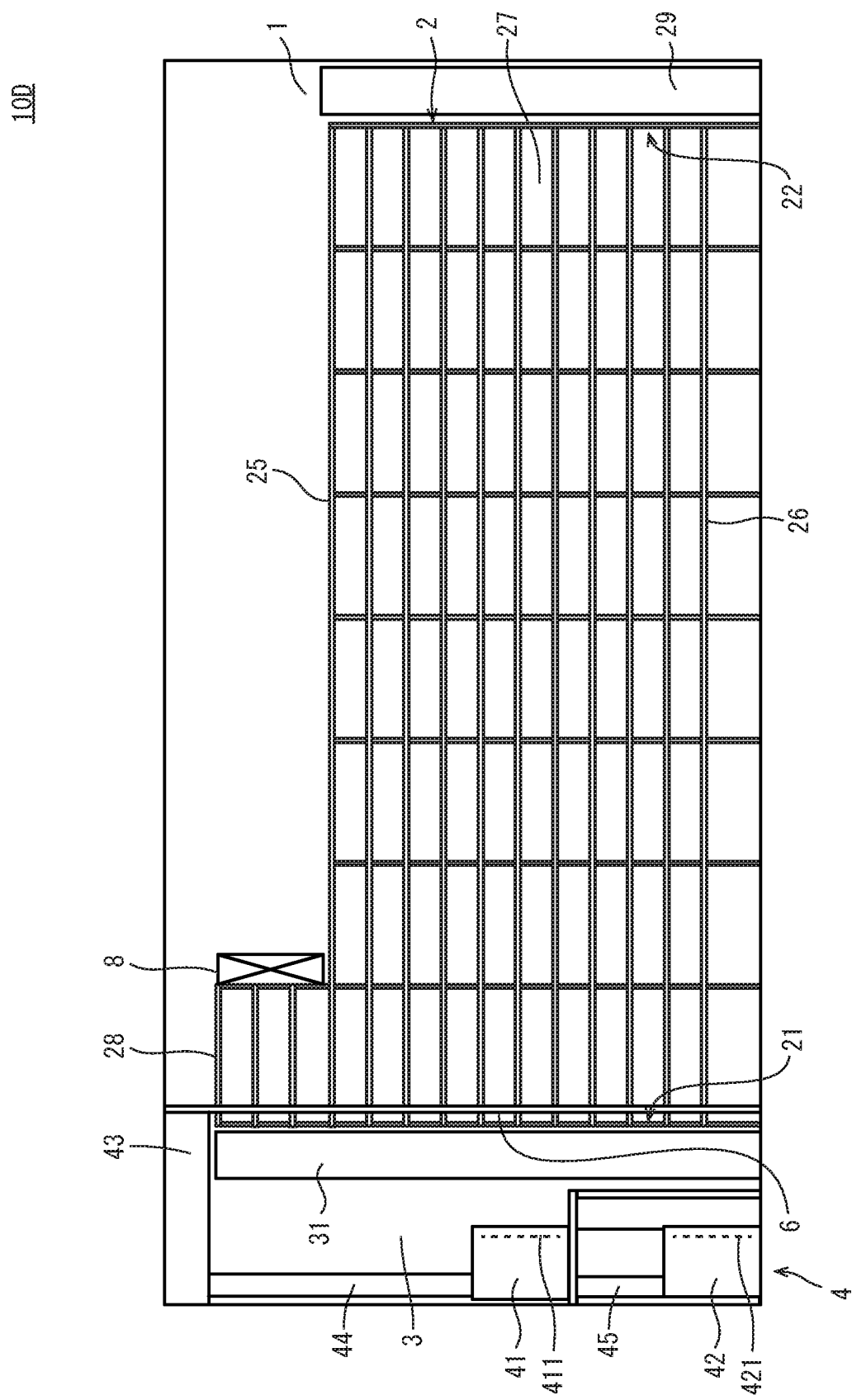
FIG. 8 is a side view of a plant cultivation facility according to a fifth embodiment.

FIG. 8 is a schematic side view of a plant cultivation facility 10D according to the fifth embodiment.

The plant cultivation facility 10D according to the fifth embodiment shown in FIG. 8 is different from the plant cultivation facility 10B according to the third embodiment shown in FIG. 6 in that no ceiling fans 9 are provided. The fans 8 are provided, but are mounted on a support member 28, rather than the partition 6. The support member 28 is not limited to any particular construction; in the implementation shown, it has a construction similar to that of the cultivation racks 2. Specifically, the support member 28 has support poles extending upward from the portions of the cultivation racks 2 adjacent to the air outlets 21, and is composed of three shelf-like stages. The support member 28 is only composed of a frame. In the support member 28, no nutrient-solution tubs 24 are provided and no plants are cultivated. The chambers 43 are provided above the air-conditioning room 3. Specifically, the chambers 43 are formed by spaces separated from the air-conditioning room 3 by insulating members or the like. Further, one end of each cultivation rack 2 protrudes from the partition 6 into the air-conditioning room 3 and its air outlet (i.e. plant entrance) 21 is located within the air-conditioning room 3. Otherwise, the plant cultivation facility 10D has the same construction as the plant cultivation facility 10B according to the third embodiment. Air that has been forwarded from the chambers 43 flows into the interior of the support member 28 through its top, and is vigorously moved by the fans 8 to above the cultivation racks 2. The fifth embodiment is an example in which the space necessary for installment of the fans 8 and operation of the entrance device 31 is implemented using a support member 28 formed by an extension of the framework of the cultivation racks 2.

Although embodiments have been described, this disclosure is not limited to the above-illustrated embodiments, and various modifications are possible without departing from the spirit of the disclosure.

The invention claimed is:

1. A plant cultivation facility comprising:
a plurality of cultivation racks each including a plurality of shelves for cultivating plants and a pair of closed sides extending in a longitudinal direction, the plurality of shelves each forming a tube inner space extending in the longitudinal direction, each of the shelves including an air inlet formed as an opening on one end of the tube inner space and an air outlet formed as an opening on the other end of the tube inner space;
a cultivation room containing the cultivation racks;
an air-conditioning room separated from the cultivation room;
an air-conditioning device positioned in the air-conditioning room to suck air from the cultivation racks through the air outlets into the air-conditioning room; and
a discharge pipe positioned in the air-conditioning room, the discharge pipe connected to the air-conditioning device to forward air from the air-conditioning room to be released into the cultivation room.

2. The plant cultivation facility according to claim 1, wherein
the air-conditioning device includes an air filter, and
the plant cultivation facility further comprises an air release means connected to the discharge pipe for releasing air from the air-conditioning device that has passed through the air filter into the cultivation room.

3. The plant cultivation facility according to claim 2, wherein
the air-conditioning device further includes:
a heating/cooling device;
a dehumidifier; and
a chamber connected to the heating/cooling device and to the dehumidifier, wherein air from the heating/cooling device and the dehumidifier is introduced into the chamber, and the air release means releases air from the chamber into the cultivation room.

4. The plant cultivation facility according to claim 1, wherein
the plurality of cultivation racks are positioned in parallel, and
the plant cultivation facility further comprises an air release means connected to the discharge pipe, the air release means being located higher than the cultivation racks for releasing air from the air-conditioning device into between adjacent cultivation racks.

5. The plant cultivation facility according to claim 4, wherein the air release means is a duct extending in the longitudinal direction of the cultivation racks.

6. The plant cultivation facility according to claim 4, further comprising:
a partition positioned between the cultivation room and the air-conditioning room,
wherein the air release means includes a fan provided on the partition.

7. The plant cultivation facility according to claim 1, wherein the one air conditioning device is associated with the two or more cultivation racks.

8. A plant cultivation facility, comprising:
a cultivation room;
an air-conditioning room separated from the cultivation room;
a cultivation rack located inside the cultivation room and including a plurality of shelves, each forming a tube inner space extending in a horizontal direction and including an air inlet open in the cultivation room and an air outlet connected into the air-conditioning room; and
an air-conditioning device positioned inside the air-conditioning room to suck air from the tube inner space into the air-conditioning room through the air outlet and forward the sucked air to the cultivation room.

9. The plant cultivation facility according to claim 8, further comprising:
a discharge pipe connected between a blowout port on the air-conditioning device and the cultivation room to forward air blown out of the air-conditioning device to the cultivation room.

10. The plant cultivation facility according to claim 8, wherein
the air inlet is a plant exit through which the plants are transportable out of the cultivation rack, and
the air outlet is a plant entrance through which the plants are transportable into the cultivation rack.

11. The plant cultivation facility according to claim 8, further comprising:
a partition positioned between the cultivation room and the air-conditioning room, the partition being adjacent to the air outlet.

* * * * *